Figure 1:
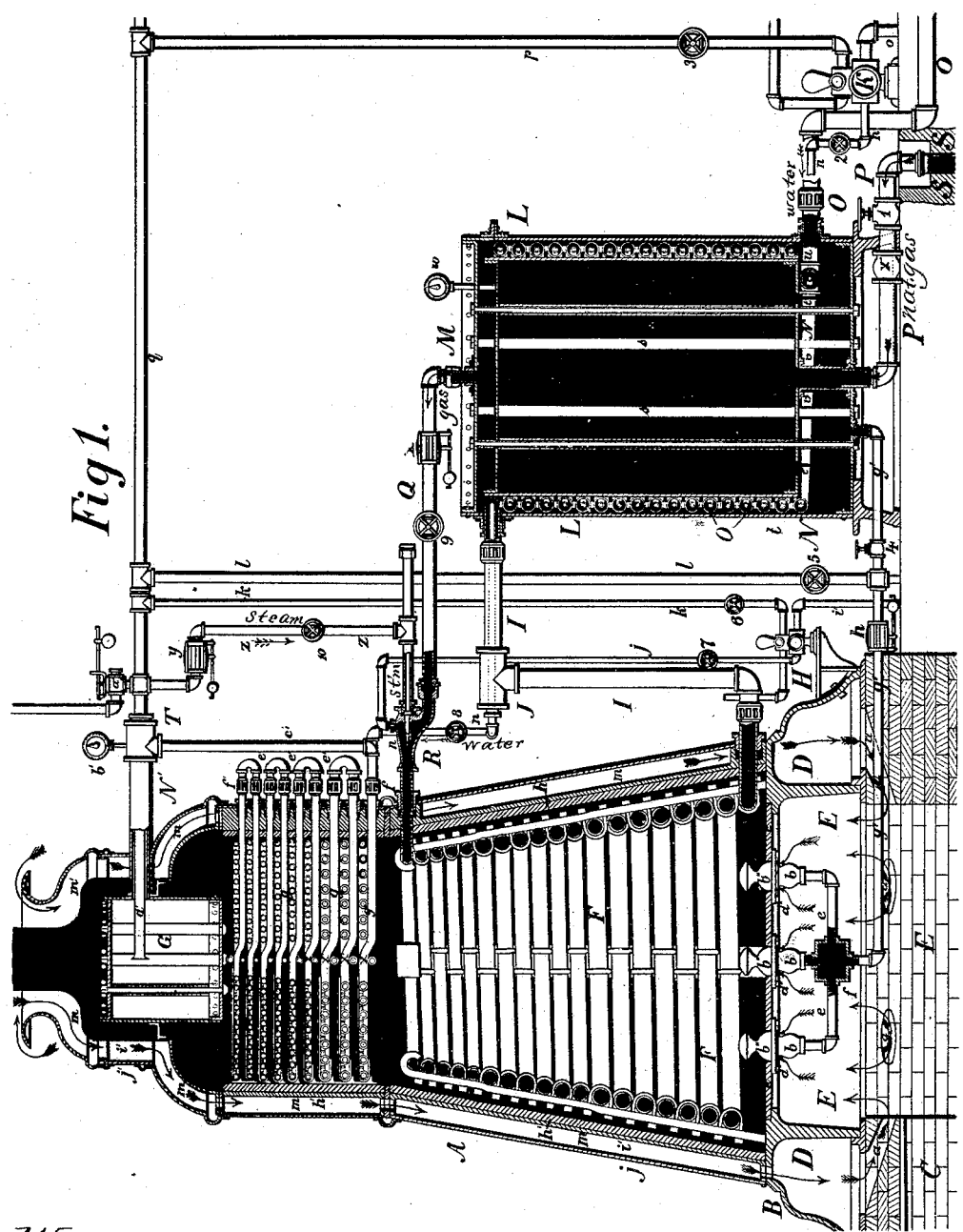

(No Model.) 4 Sheets—Sheet 1.

W. F. BROWNE.
PROCESS OF TREATING HEATING AND ILLUMINATING GASES.

No. 331,225. Patented Nov. 24, 1885.

Witnesses:
Wm A Bartlett
J. J. Halsted.

Inventor
Wm. Frank Browne (No Model.)  W. F. BROWNE.  4 Sheets—Sheet 2.
PROCESS OF TREATING HEATING AND ILLUMINATING GASES.
No. 331,225.  Patented Nov. 24, 1885.
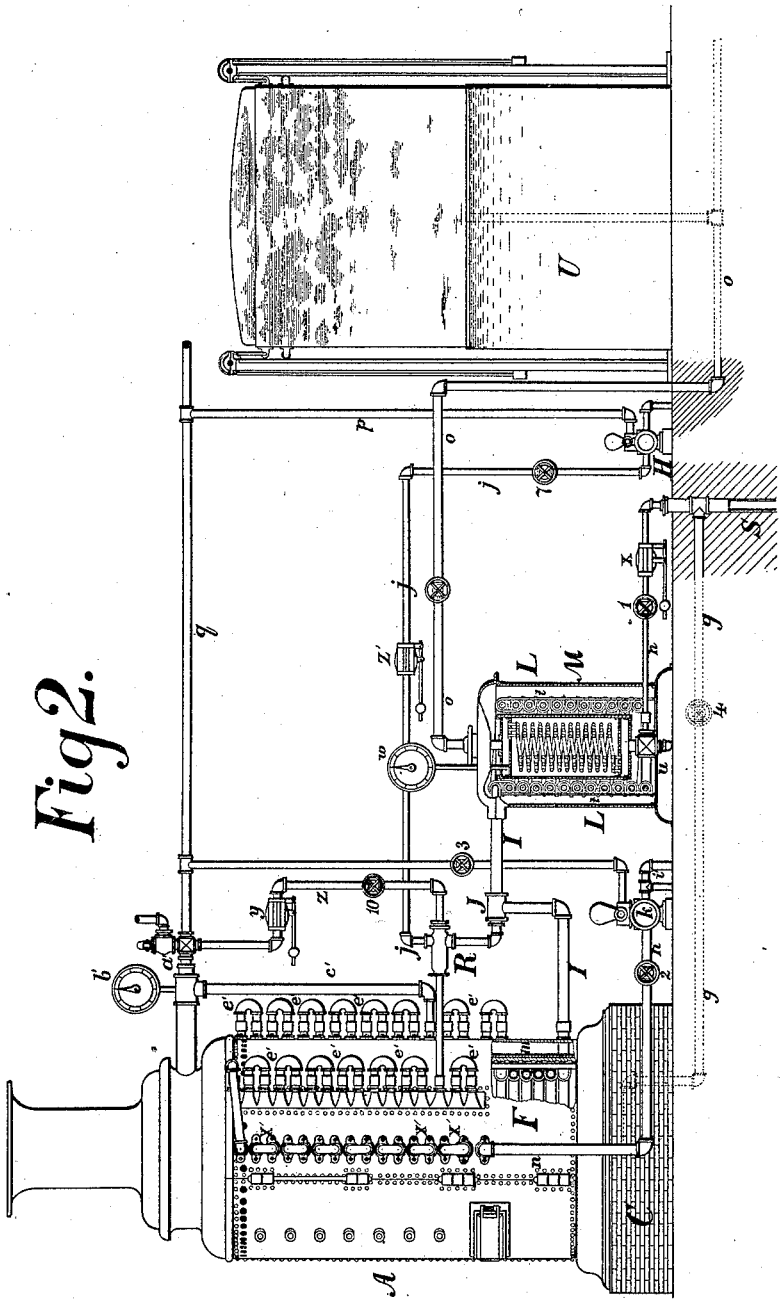
Witnesses:
W. H. Bartlett
J. J. Halsted
Inventor
Wm. Frank Browne (No Model.)
W. F. BROWNE.
PROCESS OF TREATING HEATING AND ILLUMINATING GASES.
No. 331,225. Patented Nov. 24, 1885.
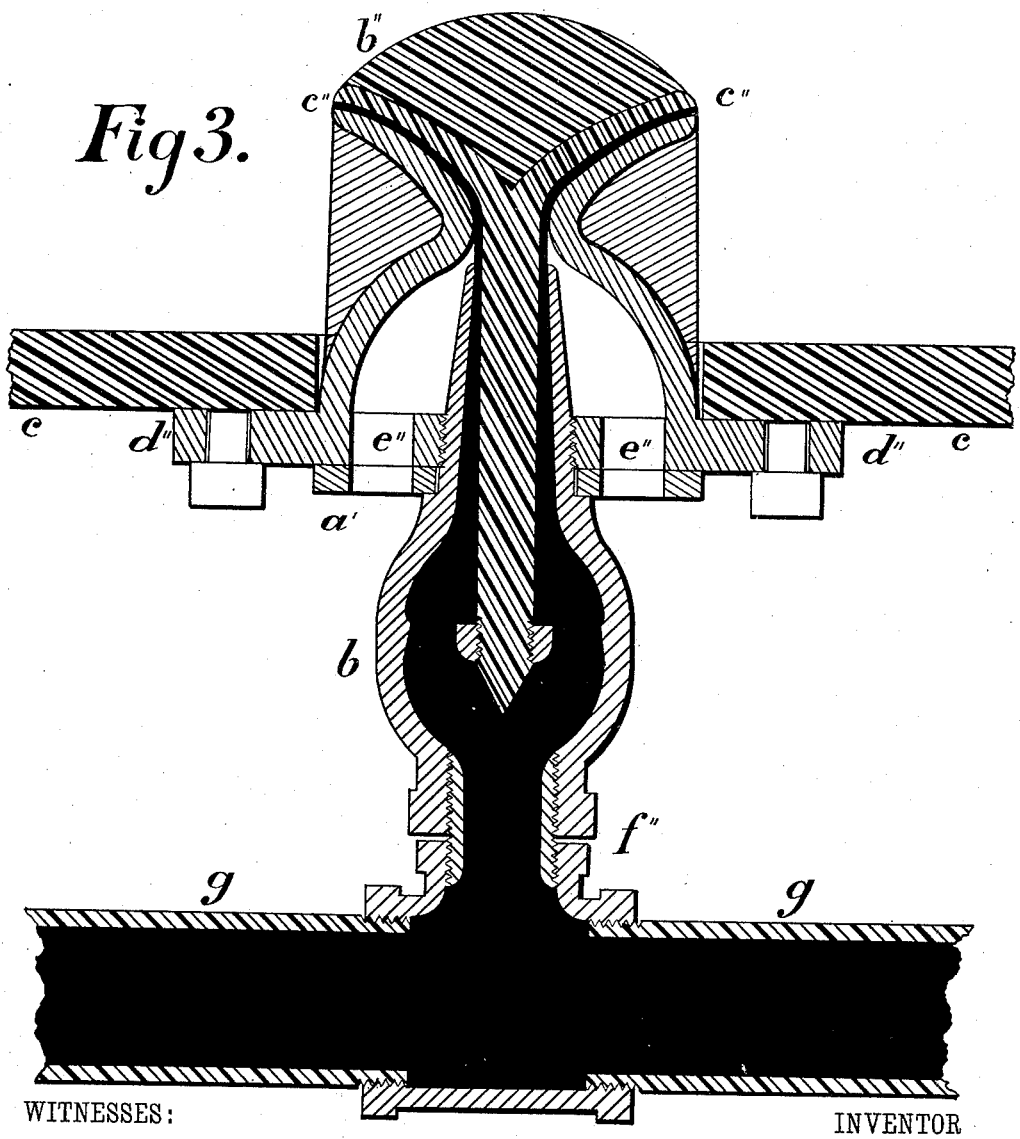

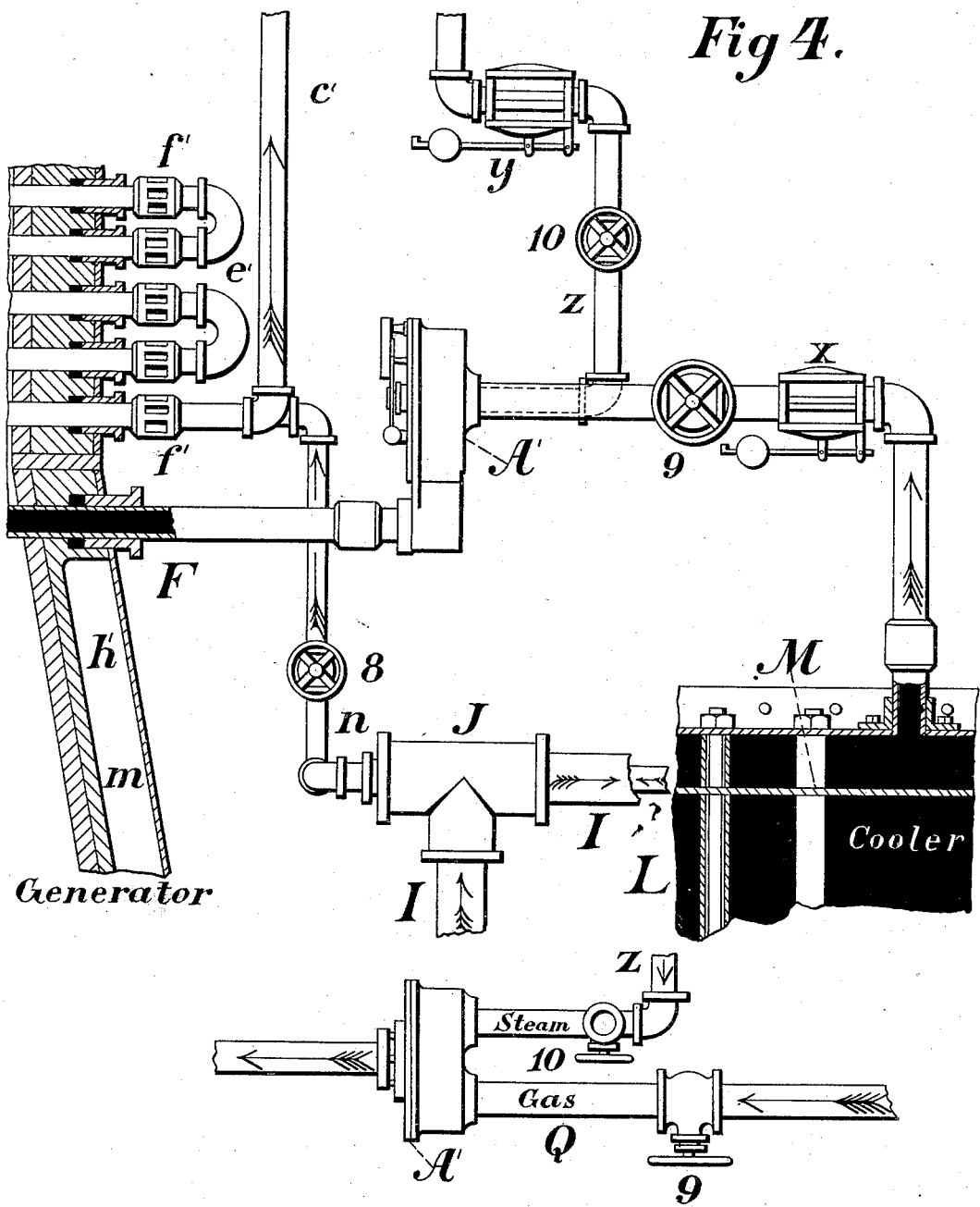

UNITED STATES PATENT OFFICE.

WILLIAM FRANK BROWNE, OF NEW YORK, N. Y.

PROCESS OF TREATING HEATING AND ILLUMINATING GASES.

SPECIFICATION forming part of Letters Patent No. 331,225, dated November 24, 1885.

Application filed March 28, 1884. Serial No. 125,831. (No model.)

*To all whom it may concern:*

Be it known that I, WILLIAM FRANK BROWNE, of the city, county, and State of New York, have invented a new and useful Process of Treating Heating and Illuminating Gases; and I do hereby declare that the following is a clear and full description thereof, reference being had to the accompanying drawings, which form a part of this specification.

This invention relates to a process of treating gases for heating and illuminating purposes.

The process consists in conducting gases or gaseous vapors, or gas which is either too poor or rich in carbon, into suitable heated devices, in connection with steam, hydrogen, or other suitable gases, wherein decomposition and recomposition of the elements are effected, and a fixed heating or illuminating gas of the required quality is obtained. When the gas or gaseous vapor is too rich in carbon, a jet of steam in proper proportion is conducted with the gas into heated devices, wherein a decomposition of the steam is effected by means of the carbon uniting with the oxygen, thus forming a fixed carbonic oxide and carbureted hydrogen gases in any suitable proportions required for either heating or illuminating purposes. When gas or gaseous vapor is too poor in carbon for illuminating purposes, it is conducted into suitable heated devices, in connection with a gas which is rich in carbon, whereby a proper illuminating-gas is formed.

This invention is more especially adapted to the treatment of wild gas, or the gas which comes from the earth. This gas flows from the wells at varying pressures and of different qualities, but generally too highly carbureted for desirable heating and illuminating gases. Therefore when too highly carbureted the gas is conducted into heated conduits, in connection with a diluent—such as water, steam, superheated steam, hydrogen, carbonic oxide, or carbonic-acid gases, or with any admixture of the above-mentioned gases or fluids. The matter can flow or be caused to flow through the conduits in any desired proportion, whereby heating or illuminating gas of the desired quality will be the result. When the flow of the gas is varying or intermittent, it is at first conducted from the well into a receiver of suitable dimensions and strength, and from thence through an equalizing-valve into the generator, by which means a constant flow and pressure can be maintained in the generator, in connection with the necessary matter, which also flows through an equalizing-valve, to enrich or impoverish the wild gas, after which it is discharged into suitable receivers for use.

Figure 1 represents a vertical central section of a plant or apparatus for treating gases. Fig. 2 represents a central vertical section of a condensing device, a generator, partly in section, and a gas-holder. Fig. 3 represents a central vertical section of a pressure gas-burner. Fig. 4 represents a device for proportioning gas and steam or gases.

Corresponding letters refer to similar parts in all of the figures.

The generator A, Figs. 1 and 2, consists of a series of conduits inclosed in a shell, which rests upon a base, B, which is provided with an annular flue, D. This base rests upon the foundation C. The air-chamber E is supplied with air, which is drawn downward through the annular flue $m$, between the two jackets $j'$ and $i'$, into the annular flue D, from thence through a series of flues, $a$, into air-chamber E, as indicated by arrows.

The upper coils $g$ are for the purpose of generating steam to be used in connection with the gas to be treated. These coils can also be used to generate carbonic-acid gas or carbonic oxide and free hydrogen, all of which gases can be used in combination with the wild gas. The water from which the steam is generated is forced by pump K through pipe $n$ into internal coil, $t$, from thence through continued pipe $n$ into a series of cross-pipes, X, as shown in Figs. 1 and 2, from thence into the uppermost of the series of steam-coils $g$, thence down through the series, from whence the steam is discharged through pipes $c'$ and N' into dome G, from thence through pipe $d'$ to whatever point desired. The coils $g$ and cross-pipes X are connected by return-bends $e'$ and right and left couplings $f'$, as shown in the figures. The inner shell is lined with asbestus, $h'$. Gage $b'$ indicates the pressure of steam, while gage $w$ indicates the pressure of gas in the well or earth. Condensing-chamber L is made strong enough to sustain the maximum pressure of gas in the well. The condensing-coil should fit closely to the chamber, while the dome M should fill the entire space within the interior diameter of the coil, thus forming between the turns of the coil an annular spiral passage communicating between the opposite ends of the condensing-chamber and dome. The dome is suitably connected by pipes *v* P and fittings to the casing of gas-well S. Check-valve X″ prevents the gas from being withdrawn from the dome during the intermittent pressure caused by the pulsations of the gas in the well and earth. The exit of the gas from chamber L and dome M is regulated by the equalizing-valve *x*. This valve, being set to deliver gas at a much lower pressure than the maximum pressure in the well, and in connection with dome M, will deliver gas during the pulsation of the gas in the earth in a constant and unvarying flow into the generator. This gas flows from the equalizing-valve through pipe Q into injector R, from there into conduit or generator F. The gas enters the injector simultaneously with a jet of steam which is delivered from equalizing-valve *y* through pipe Z and controlling-valve 10 into injector R, from whence the steam and gas are forced together through the heated conduit F, from whence the product is discharged into pipe I, condensing-coil, and pipe O into a holder. (Shown on Fig. 2.)

In order to decompose and recompose and fix the gas properly, a suitable portion of the conduit F should be heated to a red heat, or nearly so, this heat being required for a thorough decomposition of the elements while being forced through said conduit. The flow of the gas can be so regulated that a constant red heat can be maintained by a uniform combustion within the furnace.

The heat required for decomposition of the gases is transmitted by the gas from the furnace, and must be radiated, therefore, before the gas is forced into a holder. Now, a saving in fuel would be effected were this heat to be returned to the generator, and which becomes practical by adopting the process and means as follows: The discharge-pipe I connects the eduction of the generator with the condensing-coil N, through which the gas flows in a contrary direction to the flow of the feed-water through the internal coil, thus absorbing heat, which is carried into the steam-generator, from thence into the gas-generator, from whence it is again discharged into the condensing-coil. It will be perceived that by means of the two currents the gas is being gradually cooled, while the feed-water is being gradually heated, so that by the time the gas and feed-water have passed through their respective coils the gas becomes as cold as the feed, while the feed becomes as highly heated as the gas, which will be true when the coils are of sufficient length for the water and gas to absorb and impart all of the heat, minus the radiation from the outer coil, which heat is also imparted to the gas which is to be treated while on its way to the generator. The gas is conducted from the well by pipe P, and discharged therefrom into dome M, thence returned through orifices *t′ t′* into the surrounding chamber L, thence through a spiral channel formed by the space between the turns of the coil and the inner and outer walls of the condensing-chamber and dome, into the upper chamber formed by the two upper heads of the dome and condensing-chamber, from whence it is discharged into the injector R and generator, as indicated by the arrows. The injector or other means is necessary when the pressure in the well is insufficient to force the gas through the conduits in the required quantity. This process can also be employed to enrich water-gas, which is now made, purified, and discharged into holders, from thence to retorts, where, in combination with hydrocarbon fluids, it becomes enriched for illuminating purposes. The hydrocarbon can be introduced by a forcing device, as shown in Fig. 1, or by other suitable means. In case a light volatile hydrocarbon—such as naphtha—is used to enrich the gas, it can be introduced into the conduit after the heated gas leaves the generator. The heat from the hot gas will volatilize the naphtha, while only a portion of it will enter into chemical combination with the poor gas. Steam can also be used in this combination; but the most practical method of enriching the gas is to force the liquid hydrocarbon or any proper carbonaceous matter into the gas just prior to its entrance into the generator; also, another practical method is, when the natural supply of gas is limited, and not enough for consumption, to force water and hydrocarbon oils or other suitable carbonaceous matter into the steam-generator and make a rich gas or gaseous vapor, and discharge it, in combination with the gas to be treated, into the generating or treating conduit, wherein the proper combination will be effected. These gases can be made in separate generators and combined in either one separately or in both or in the third one; but for ordinary work one generator is all that will be required. Water or oil and water, or water combined with any suitable carbonaceous matter, can be forced directly in connection with the gas into the treating-conduit and a fixed gas discharged therefrom of whatever grade required.

The equalizing-valves *y* and *x* are for delivering the gas and steam to the generator under equal pressures, the proportion being determined by the proportional device shown in Fig. 4. By means of this proportional device and equalizing-valves any grade or quality of gas can be made. A similar proportional device can also be used to determine the proportion of carbonaceous matter and water for a required quality of gas for either heating or illuminating purposes.

The heat for the generator can be obtained from the combustion of the gases. The gas can be conducted from the condensing-chamber L through pipe $g'$ into distributing-chamber $f$, from thence through pipe $c$ into burner $b$, from which the gas is discharged into the furnace. The equalizing-valve $h$ is employed to maintain a constant pressure and flow of gas into the furnace.

This burner is made in such manner that the current of gas causes a draft of air to be drawn through openings $c''$ and discharged with the gas into the furnace. Plate $c$ covers the entire arc of the furnace, with exception of the holes through which the burners project. Flange $d''$ is bolted to the under side of the plate. The draft is controlled by the register $a'$, which can be operated by a rod on the outside of the furnace.

What I claim, and desire to secure by Letters Patent, is—

1. The process of bringing natural gas of varying quality to the desired standard or candle-power, which consists in conducting it simultaneously with a rich or poorer gas or vapor, as required, under pressure through a heated conduit, whereby decomposition and recomposition are effected and the desired result obtained.

2. The process of treating natural gas of varying quality, consisting in conducting such gas by its own natural pressure into heated conduits simultaneously with the inflow therein of an artificial gas under pressure, which will chemically combine therewith and form a fixed gas prior to its discharge into suitable receivers.

3. The process of treating natural gas of varying chemical properties, consisting in conducting such gas by its own pressure into heated conduits simultaneously with a continuous inflow under pressure of suitable material which will chemically combine therewith prior to the discharge thereof from said conduits in the form of a fixed gas.

4. In the process of treating natural gas, the mode of utilizing the heat contained in the treated gas on its discharge from the heated conduit, which consists in conducting such treated gas into suitable devices, wherein the heat is absorbed by the natural gas prior to its inflow into the conduit, wherein the gas is more highly heated, and chemically combines with the material which simultaneously flows therein prior to its discharge into and from said devices wherein the heat is absorbed.

WM. FRANK BROWNE.

Witnesses:
    W. H. BIGELOW,
    OLAF ANDERSON.